(12) United States Patent
Warlow et al.

(10) Patent No.: US 6,814,214 B2
(45) Date of Patent: Nov. 9, 2004

(54) PALLET AND CONVEYOR SYSTEM FOR LOADING ONTO TRANSPORT

(75) Inventors: Jerry L. Warlow, Lebanon, PA (US); Boris Fridman, York, PA (US)

(73) Assignee: Mobil Concepts, Inc., Myerstown, PA (US)

( * ) Notice: Subject to any disclaimer, the term of this patent is extended or adjusted under 35 U.S.C. 154(b) by 0 days.

(21) Appl. No.: 10/407,674

(22) Filed: Apr. 4, 2003

(65) Prior Publication Data

US 2004/0195072 A1 Oct. 7, 2004

(51) Int. Cl.$^7$ .............................................. B65G 41/00
(52) U.S. Cl. ..................... 198/300; 198/799; 198/314; 414/679; 414/528; 414/331.04
(58) Field of Search ........................ 198/300, 314, 198/317, 799, 352, 353, 679, 572, 528, 502, 236, 237, 247, 248, 251, 331.04; 414/352, 353, 679, 572, 528, 502, 236, 237, 247, 248, 249, 251, 331.04

(56) References Cited

U.S. PATENT DOCUMENTS

| | | | |
|---|---|---|---|
| 1,258,377 A | * | 3/1918 | Stuart .......................... 414/528 |
| 1,360,010 A | * | 11/1920 | Nelson ......................... 414/293 |
| 1,405,952 A | * | 2/1922 | Stuart ............................. 71/14 |
| 1,639,435 A | * | 8/1927 | Nilsson ........................ 198/637 |
| 1,753,914 A | | 4/1930 | Bodge et al. |
| 2,316,826 A | * | 4/1943 | Wachter ....................... 414/472 |
| 2,521,727 A | | 9/1950 | Kappen |
| 3,868,027 A | * | 2/1975 | Matsuura ...................... 414/251 |
| 4,067,437 A | | 1/1978 | Frantl et al. |
| 4,372,723 A | | 2/1983 | De Coene et al. |
| 4,642,018 A | | 2/1987 | Leroux et al. |
| 5,007,793 A | | 4/1991 | Irvin |
| 5,447,407 A | | 9/1995 | Weaver et al. |
| 5,611,422 A | | 3/1997 | Harkonen |
| 5,899,657 A | * | 5/1999 | Hodges ........................ 414/609 |
| 6,379,107 B1 | | 4/2002 | Iwasaki et al. |

* cited by examiner

Primary Examiner—Richard Ridley
(74) Attorney, Agent, or Firm—John F. Salazar; Middleton Reutlinger

(57) ABSTRACT

A pallet and conveyor system for loading pallets onto a transport vehicle is described. The conveyor system has a first and a second conveyor which positions the pallets between the conveyors and maintains the pallets in upright orientation. The conveyor defines an upper conveyance track and a lower conveyance track which may be placed on the bed of a transport truck. The pallets maintained in the conveyor system are easily loadable on the truck and can be captured without operator lifting by the conveyor system. The pallets may be forked from any direction and provide a stabilization device for maintaining the cargo within the pallets.

15 Claims, 8 Drawing Sheets

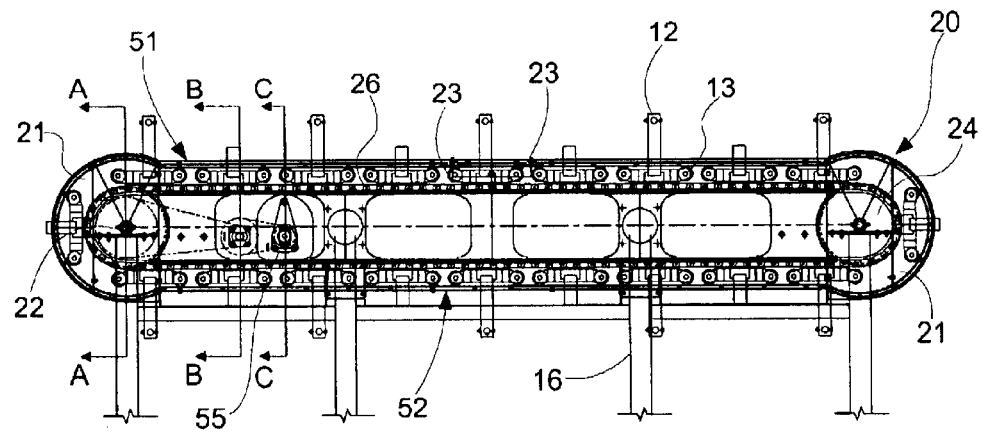
FIG. 1
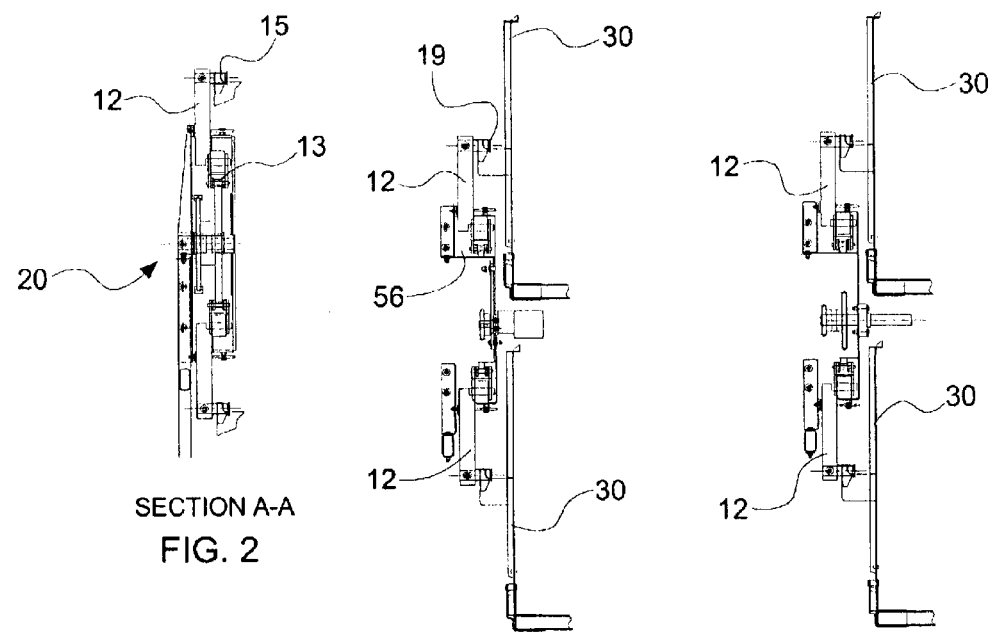
SECTION A-A
FIG. 2
SECTION B-B
FIG. 3
SECTION C-C
FIG. 4

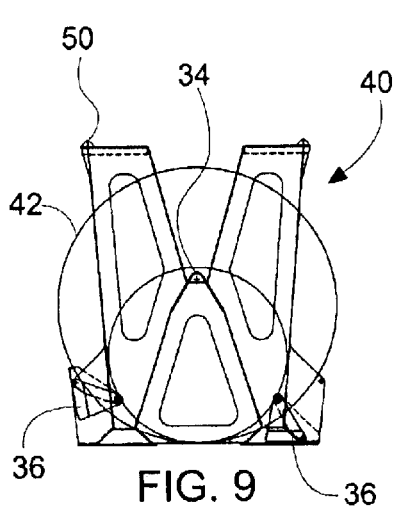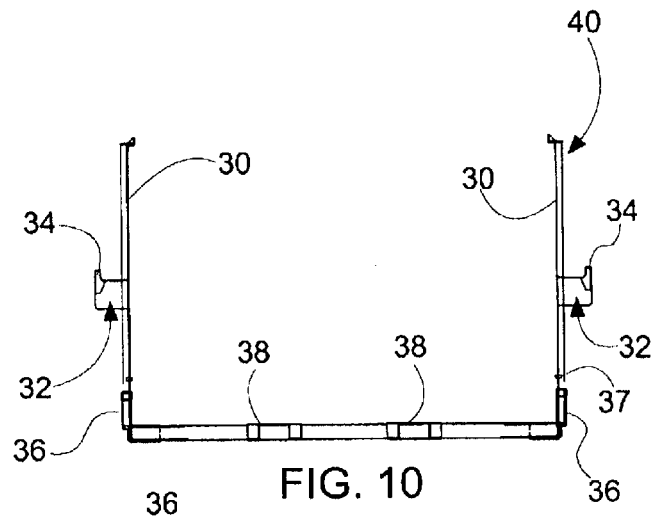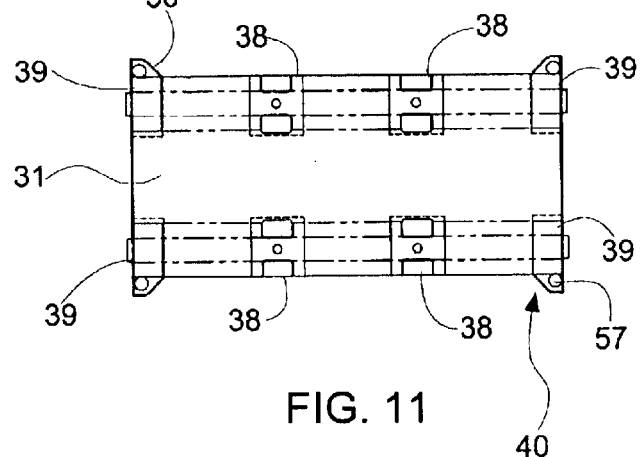

PALLET AND CONVEYOR SYSTEM FOR LOADING ONTO TRANSPORT

TECHNICAL FIELD

The present invention relates to a system for storage and transportation of material in pallets, particularly tires, and a conveyor system for movement of the pallets.

BRIEF DESCRIPTION OF THE DRAWINGS

FIG. 1 is a side sectional view of the conveyor system of the present invention;

FIG. 2 is a first front sectional view of the conveyor system taken along sectional lines A—A shown in FIG. 1;

FIG. 3 is a second first sectional view taken along sectional lines B—B shown in FIG. 1;

FIG. 4 is a third front sectional view taken along section C—C shown in FIG. 1;

FIG. 9 is an end view of the pallet design for the present invention;

FIG. 10 is a front view of the pallet design of the present invention;

FIG. 11 is a bottom view of the pallet design of the present invention;

DETAILED DESCRIPTION OF THE PREFERRED EMBODIMENTS

Figure 5:
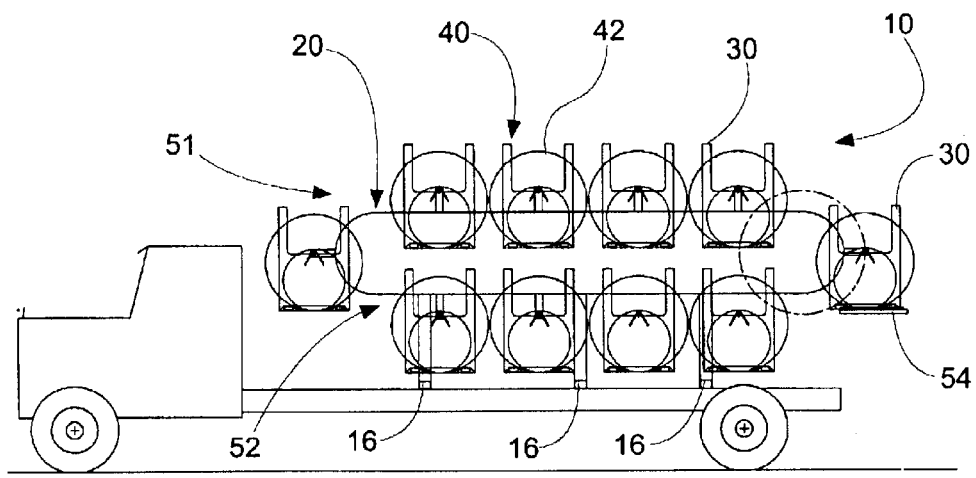
FIG. 5 is a side view of the pallet and conveyor system for loading onto a transport vehicle of the present invention.

The pallet and conveyor system 10 of the present invention depicted in the drawings allows for loading, storage and unloading of large objects, particularly tires stored in pallets, onto a transport vehicle with minimal interaction required by an operator. As shown in FIG. 5, the truck conveyor system 10 may be adapted for use on a transport vehicle, such as a flat bed truck shown, and used in combination with a plurality of pallets for storage and movement of the loaded material, in this case, for example, tires, and allows for placement of the pallets and the material stored therein onto the transport vehicle in organized and readily accessible fashion. As shown, the conveyor 20 may rotate in a ovalized conveyor path or pattern so that the pallets may be easily stored on the transport vehicle and also moved thereon. The pallet and conveyor system 10 of the present invention having a first and a second circular conveyor in spaced apart relationship on the truck bed allows the pallets, and necessarily the tires located thereon, to be rotated on the truck in order to deliver the stored material to both ground level and dock level without the need for manual lifting. The pallet and conveyor system 10 of the present invention further makes efficient use of the space available on the transport vehicle by utilizing a first conveyor path suspended over a second conveyor path. The pallet and conveyor system 10 of the present invention easily loads and utilizes currently available equipment while nearly eliminating any manual handling at the truck and any drop-off or loading station.

As shown, for exemplary purposes for the present embodiment, the pallets 40 may store a plurality of tires 42 located thereon in side-by-side relationship, each of the tires weighing up to 240 pounds. The tires, in this example, efficiently utilize the entire space of the transport vehicle and pallet while making loading and unloading easily completed.

Returning to FIG. 1, the conveyor 20 used in the pallet and conveyor system 10 of the present invention is depicted. As seen in combination with FIG. 1 and the schematic of FIG. 6, the conveyor shown is one side of the two conveyor system. As shown therein, a conveyor mechanism is provided for transportation of the pallets 40 which contain the stored cargo within the truck. The conveyor mechanism 20 has both a forward sprocket 22 and a rear sprocket 24 which rotates a drive chain 26. The entire conveyor mechanism 20 is supported upon a plurality of supports 16 on the bed of a truck or other transport. The conveyor 20 has located thereon a plurality of carriages 12 which are affixed to the drive chain 26 by carriage trucks 13. The design sets forth a mechanism for conveyance of the plurality of pallets 40 in an organized fashion wherein the pallets 40 are supported on either side by a carriage 12 and rotated on the transport by a conveyor 20 rotationally affixed to either side of each pallet. The conveyor, depicted in the Figures, is only an exemplary conveyor design for movement and support of the pallets 40 and a number of different embodiments may be utilized for support and movement of the pallets on the transport vehicle.

In general, as described in one embodiment shown in FIG. 1, the conveyor 20 is comprised of the drive chain 26 which is rotated by a drive motor 55. The drive chain 26 may be rotated and aligned by the forward and rear sprockets 22 and 24 and forms both an upper conveyance path or track 51 and a lower conveyance path or track 52. The conveyor 20 thus provides the ability to have rotating upper and lower stacks of pallets 40 placed upon the transport vehicle and the ability to move the stored cargo with relative ease and without human lifting or interference.

The upper conveyance path 51 and lower conveyance path 52 are made possible by the carriages 12 and carriage trucks 13 which rotate from positions on the upper conveyor path 51 to positions on the lower conveyance path 52 by the rotation hub 21 at either end of the conveyor 20.

Figure 6:
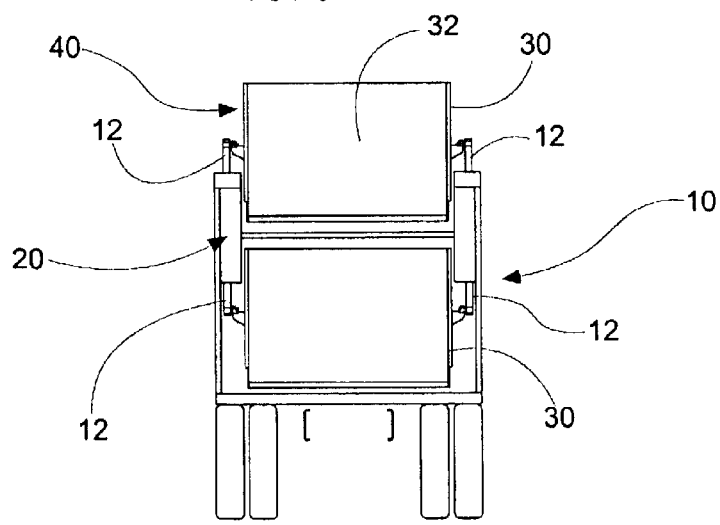
FIG. 6 is an end view of the transport vehicle depicted in the pallet and conveyor system of the present invention.

As seen in the exemplary depiction of the present invention in FIG. 5 and FIG. 6, the plurality of pallets 40 which have stored thereon tires or other cargo 42 may be rotated about the conveyor 20 between positions on the upper conveyance path 51 and lower conveyance path 52. The pallets will fully support the plurality of tires 42 located thereon in side-to-side fashion and allow the tires or other cargo to be loaded and unloaded off of the conveyor system 10 of the present invention by a lift gate 54 on the transport. Thus, placement of the loaded pallets 40 onto the lift gate of the transport vehicle allows the lift gate to raise the loaded pallet into proper position and upon activation of the truck conveyor system 10, conveyor 20 causes the pallet to be engaged by the truck conveyor system 10 so that it is loaded onto the truck conveyor system 10 and placed onto the transport vehicle.

As shown in FIG. 6, the truck conveyor system 10 of the present invention incorporates the conveyor 20 into both the left hand side and the right hand side of the truck bed for adequate engagement of the carriages 12 which fully support the pallet 40. Both an upper series or plurality of pallets 40 and a lower series or plurality of pallets may be handled and rotated by the truck conveyor system 10 about the conveyor 20 so that they may be readily loaded and unloaded from the transport vehicle. As indicated, a number of different conveying system may be utilized in order for proper rotation and storage of the loaded pallets onto the transport vehicle and as such the specific exemplary depiction of the conveyor described herein is not felt to be limiting as one of ordinary skill in the art would understand that variations to the design described herein may be readily available.

Figures 7A, 7B:
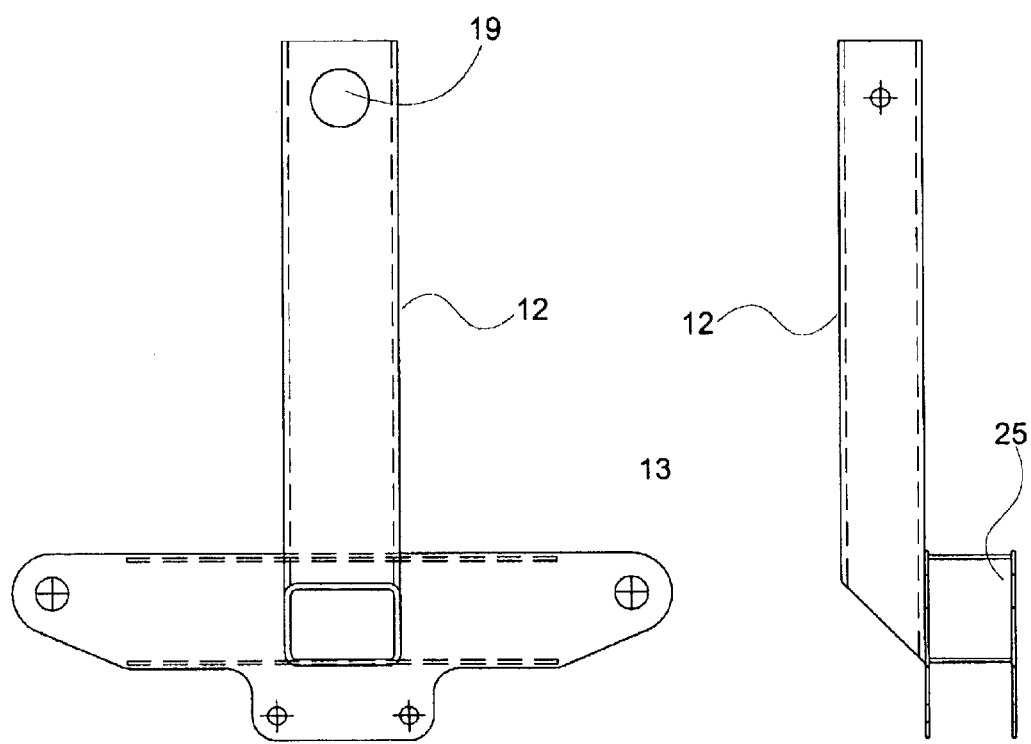
FIG. 7A is a side view of the carriage support used in the conveyor system of the present invention.
FIG. 7B is a side view of the carriage support for the conveyor system of the present invention.

Returning to FIGS. 1, 2, 3, and 4, the conveyor 20 of the present invention as depicted in the examples provides an embodiment wherein the carriage 12 is affixed to a carriage truck 13, shown in FIG. 7A and 7B, wherein the carriage truck 13 is connected to the drive chain 26. Drive chain 26, upon rotation within or adjacent to the carriage truck track 56, causes the carriage 12 to rotate from an upwardly directed position to a downwardly directed position as shown in the Figures. In both instances, the pallets are maintained in upward orientated fashion by allowing the pallets to rotate upon pin 15 at an upper end of each of the carriages 12.

Each of the carriage trucks 13 are moved by the drive chain 26 which may be rotated by at least one motor 55. Rotation hubs 21 at either end of the conveyor 20 additionally allow the carriage trucks to be positioned from the upper conveyance path or track 51 to the lower conveyance path track 52, both the upper and lower conveyance paths being co-aligned in stacked or vertical relationship as depicted in FIG. 6.

As can be readily seen in the Figures, and in particular FIG. 1, and FIG. 2, the carriage truck 13 has at either end carriage truck wheels 23 which allow the carriage truck to rotate about each of the rotation hubs 21 positioned on conveyor 20. The carriages 12 may therefore rotate positions from upwardly directed to downwardly directed smoothly while maintaining support of the loaded pallets 40 which may have significant weight. Further, each of the carriage trucks 13 are maintained in position along both the upper truck path and lower truck path within the continuous ovalized carriage truck track 56 which maintains the carriage trucks 13 in proper position along the conveyor 20. Thus, the first and second conveyor on either sides of the pallets support the pallets there between and form an ovalized rotational conveyor system which suspends the pallets between the conveyors.

Figure 8:
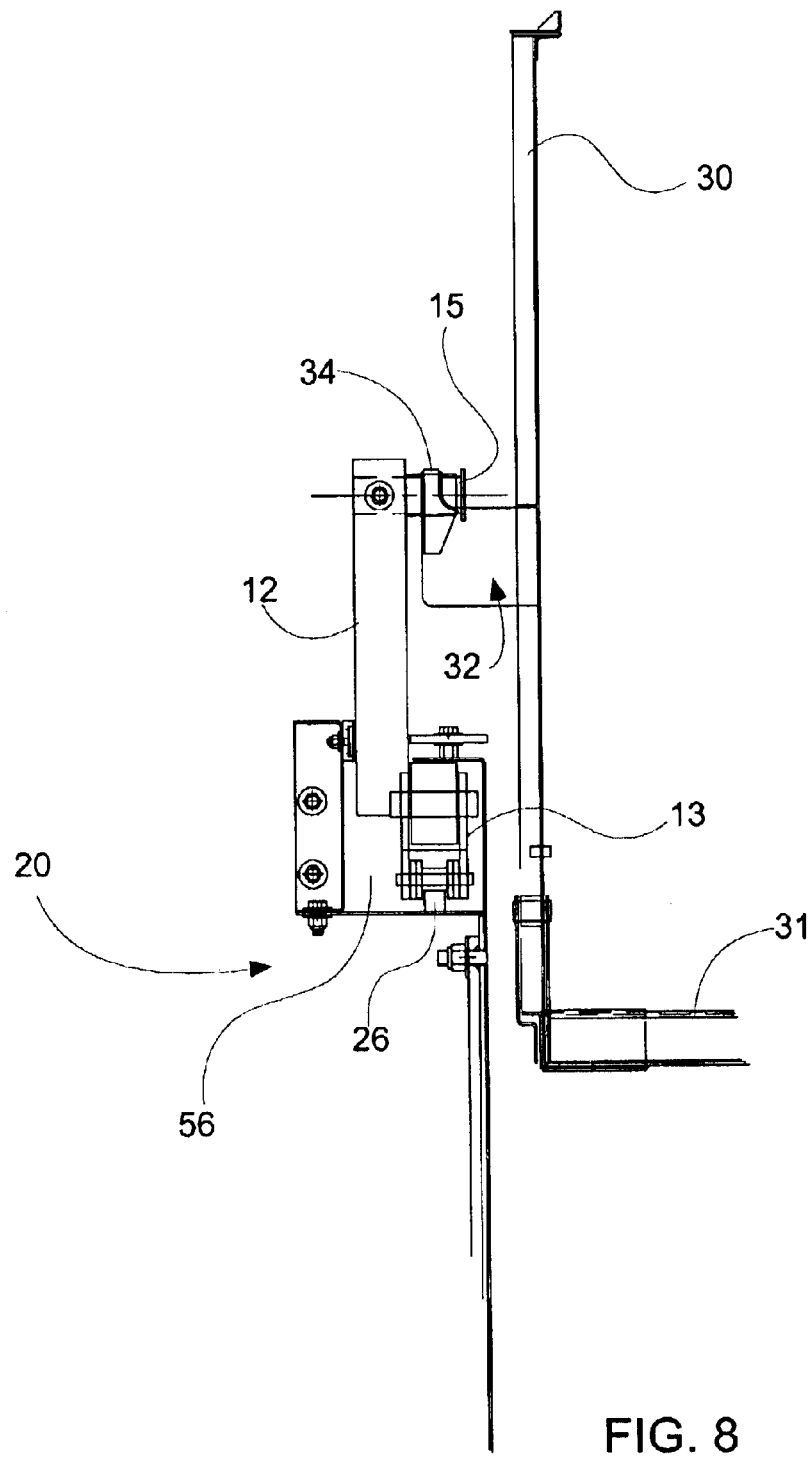
FIG. 8 is a side sectional view of the conveyor system and pallet of the present invention.

As shown in FIG. 8, the carriage truck track 56 provides an area within which the carriage trucks 13 are positioned and in which the drive chain 26 is placed for movement of the carriages 12 and therefore pallets 40. Various alternative constructions are available for construction of the track 56 in combination with the drive chain 26 in order to properly convey the carriage trucks 13 along the conveyor 20. Such modifications fall within the generalized teachings of the conveyor system 20 since such modifications are available for use in combination with the overall novel design of the conveyor system and pallet support mechanisms described.

The carriages utilized in the conveyor 20 have at an upper portion thereof a pin 15 which is utilized to support each of the pallets 40. Each of the pins 15 located at the upper end of the carriage 12 are rotationally retained within a pallet arm 32 and the pallet arm head 34, as shown in FIGS. 8 and 9. The design of the pallet arm 32 with respect to the pin 15 positioned on carriage 12, allows the pallet to freely rotate about the pin as the carriage transitions about the circular conveyor or ovalized conveyor 20. At the end of the pin 15 is a support pin head 19 which may be utilized to prevent lateral movement of the pallet 40 once positioned on both sides by the carriages 12 and by pin 15.

As shown in conjunction with the Figures, including FIGS. 7A, 7B and 8, the carriage pin 15 extends through an open area of the pallet arm 32 such that the pallet is adequately supported on either side wall 30 by the carriage 12. As depicted in FIG. 8, the carriage 12 supports the pallet along sidewall 30 by the outwardly extending pallet arm 32 such that the pallet is suspended between the left and right conveyor 20. As can be seen from this view, the pallet can be fully supported on either end with the conveyor 20 allowing the pallet to be mobilized within the truck or transport vehicle. Further, with the design of the pallet and carriage 12 of the present invention, the pallet can be loaded and unloaded with relative ease by allowing the pallet to be captured by pin 15 once the pallet is placed upon the lift gate 54 of the transport vehicle and positioned appropriately. Additionally, as can be seen from the side view of FIG. 5 and of the pallet in FIG. 9, the pallet arm head 34 may be designed as an inverted V-shaped receiving unit which allows the pin 15 of the carriage 12 to be captured therein once placed in a proper position.

Turning to the pallet design 40 of the present embodiment depicted in FIGS. 9, 10, 11 and 12, the pallet 40 has side wall 34 which defines an open interior space within which materials or cargo may be placed. As shown in the examples herein, a plurality of tires may be placed side-by-side between the side walls 30 and supported by pallet bottom wall 31. Outwardly extending from each of the pallet side walls 30 is the pallet arm 32 which contacts the pin 15 on either side of the pallet. The pallet arm and pallet arm head allows for the proper support of the pallet between the left and right conveyor. The pallet may be, for example, approximately 6 feet wide for proper supporting of the cargo and of adequate height to assure stabilized positioning of the cargo therein.

Figure 12:
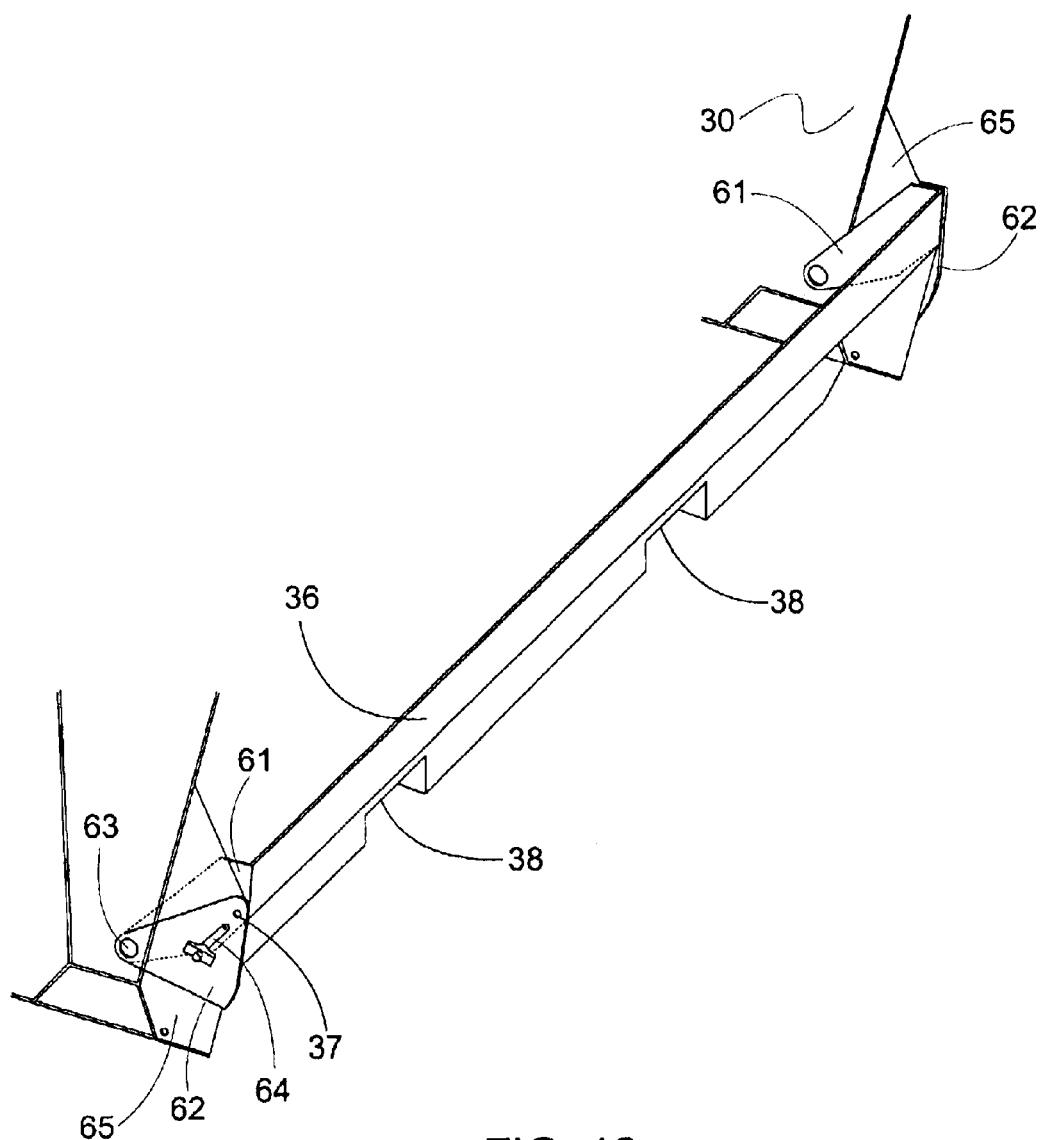
FIG. 12 is a perspective view of the pallet and tire retaining mechanism of the present invention.

Turning to FIGS. 10, 11 and 12, it is apparent that the pallet of the present design also has fork apertures 38 on both the front and back side to allow a fork lift truck to approach from the front and back for lifting of the pallet. Additionally, fork apertures 39 are provided longitudinally extending along the bottom wall 31 of the pallet such that a fork lift may approach from any side of the pallet to lift and move the pallet and loaded cargo. The fork apertures are positioned below the pallet bottom wall 31 and may be utilized for lifting as in any standard fork lift application.

Additionally, as shown in FIGS. 9–12, tire retaining device 36 may be provided on both the front and back edge of the pallet bottom wall 31. As can be seen from the example herein, the tire retaining device 36 is rotatable so that it may be raised and lowered as indicated in FIG. 9 and 12, the left most tire retaining device 36 being in the raised position and the right most tire retaining device being in the lowered position. As constructed, the tire retaining device 36, when in the lowered position, covers the fork apertures 38 on the front and back wall or edge of the pallet 40 and may also partially cover the adjacent side wall fork apertures 39 in order to prevent forking of the pallet unless the tire retaining device 36 is raised and actuated as depicted in FIG. 12. As depicted on the left hand side of FIG. 9, the tire retaining device is in the raised position in order to contact the tires 42 and maintain the tires in stable relationship within the pallet 40. As shown therein, the tire retaining device 36 may swing up and be locked in place by utilizing a ball locking retaining pin shown in FIG. 12 or other similar device which would fit through the tire retaining device 36 and into retaining pin aperture 37 placed in multiple positions around the four sides of the pallet 40 so that each side of both a front and back tire retaining device 36 may be placed in the raised and locked position. Once placed in the raised and locked position by utilizing, for example, a ball locking retaining pin or similar device, the pallet may be forked and manipulated by a fork truck as necessary or loaded onto the conveyor system 10 of the present invention. Thus, the tire retaining device 36 blocks access of the form apertures from the side and the front when not in the raised and locked position thereby forcing the operator to engage the locking device and position the tires 42 in an immobile state. The tire retaining device 36 may extend along the entire length of the front and lower edge of the pallet 40 in order to adequately cover the fork apertures 38, 39.

As depicted herein, the pallet 40 of the present design may also be stackable so that a plurality of pallets may be positioned one on top of the other for use and may readily be forked or moved when needed. As shown therein, projections 50 may extend upwardly from a top edge or top corners of the pallets in order that the pallet may be stacked one on top of the other, the projections 50 nestling within apertures 57 placed along the lower surface thereof of the tire retaining device 36 or of an alternative structure placed within the pallet bottom wall 31. Thus, the design of the pallet 40 allows for stacking of each individual pallet, one on top of the other and proper and secure placement thereof until ready for use.

Turning towards the pallet 40 of the present design, the pallet depicted in FIG. 9–14 acts as a suspension pallet which may be suspended between a first conveyor and a second conveyor. Generally, the pallet as depicted in this embodiment has a first and a second side wall on either end of a bottom wall 31, as previously described. As shown for this particular utilization, the pallet does not have a front and back retaining wall but very well may, in other variations, have a combination of side wall or front and back walls which is considered to fall within the teaching hereof.

Turning to FIG. 9, as previously described, projections 50 extend upward from a top edge of either corner of the first and second side wall. This provides the ability for mating with positionally mating apertures formed on the bottom wall 31, the apertures 57 shown in FIG. 11 and the stacking nature of the pallets shown in FIG. 13, thereby allowing the pallets to be stacked one on top of the other prior to use within the suspension conveyor system.

The suspension pallets 40 further have, as previously described, rotational capture arms 32 which rotationally connect to the supports of a first and a second conveyor system position on either side of the pallet. As a result of the rotational capture arms 32, the pallet has the ability to rotate freely about the supports or carriages of the conveyor system so that the pallets can be rotated one on top of the other within the conveyor as shown in the embodiments hereof. Alternative but equivalent designs may be utilized to limit the rotational function of the pallet and conveyor design but still allow the pallet to be stacked as well as rotated about a first and second conveyor path in stacked vertical relationship as is shown in the examples hereof.

Turning to FIG. 12, the pallets may also have a cargo or tire retaining device 36 which in this example has a longitudinally extending bar between the first and second side wall and has on either end an inner plate 61 and an outer plate 62. The inner plate and outer plate 61, 62 are provided to rotate about pivot pin 63 such that the entire cargo retaining device 36 can position itself in a locked upright position as depicted in FIG. 12 to a downward open position as shown on the right side of FIG. 13 and the other figures. The inner plate and outer plate are bound together about pivot pin 63 but provide a gap therebetween so that the plates rotate on either side of the side wall extension 65 shown in FIG. 12. The inner plate 61 and outer plate 62 both have apertures for receiving the security pin 64 therethrough which allows the cargo retaining device to be locked in either the up or down position. As previously described, in the downward position the retaining device 36 covers both fork apertures 38 on the front edge and rear edge while also covering the apertures 39 on the end wall of the pallet 40. Thus, outer plate 62 covers apertures 39 while the laterally extending bar covers the apertures 38 thereby preventing the pallet from being forked when the retaining device 36 is in the downward position.

Figure 13:
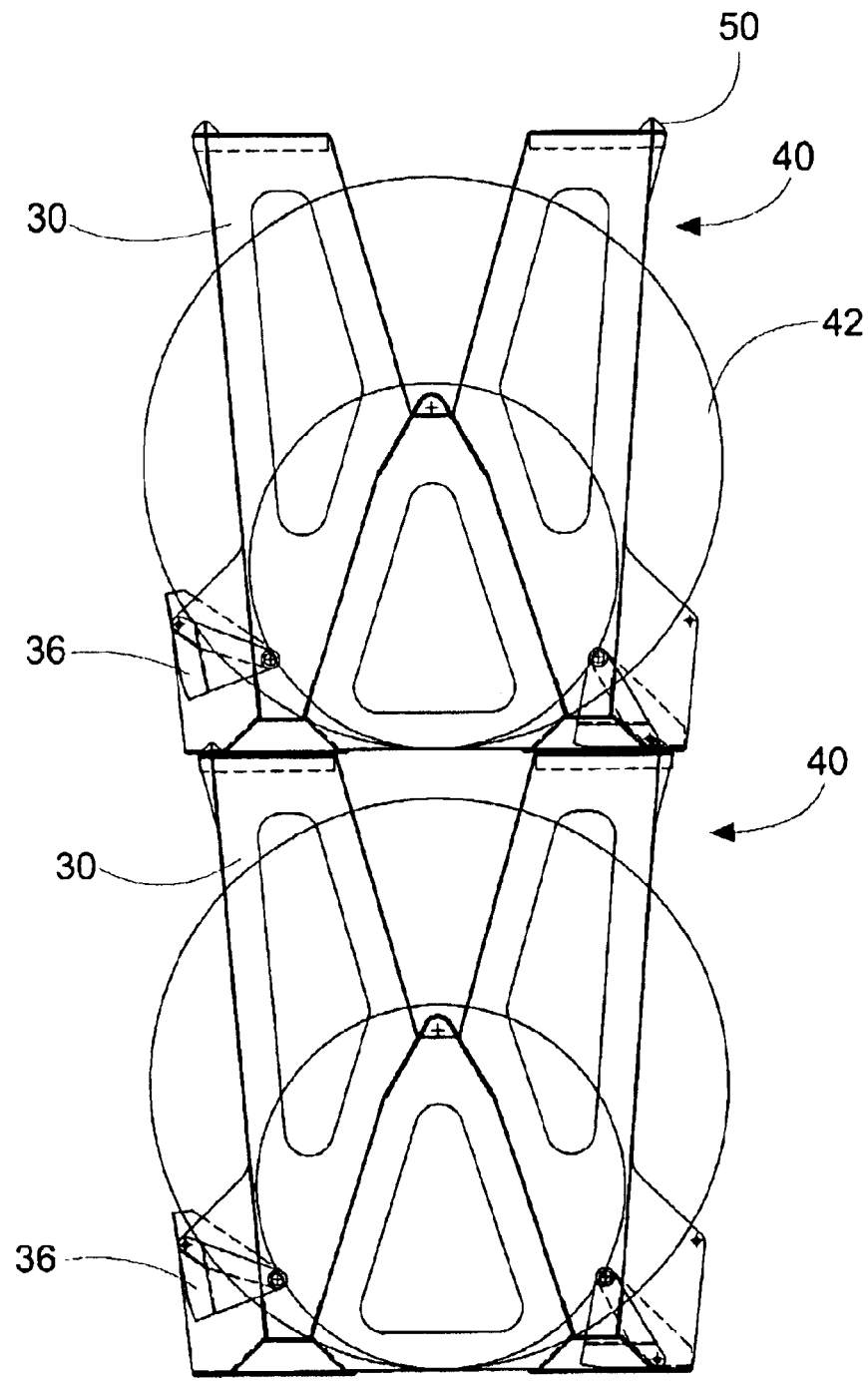
FIG. 13 is a side view of stacked pallets of the present invention.

As shown in FIG. 13, the pallets 40 may be stacked one on top of the other such that the extensions 50 have positionally mating apertures on the bottom wall as previously described.

Figure 14:
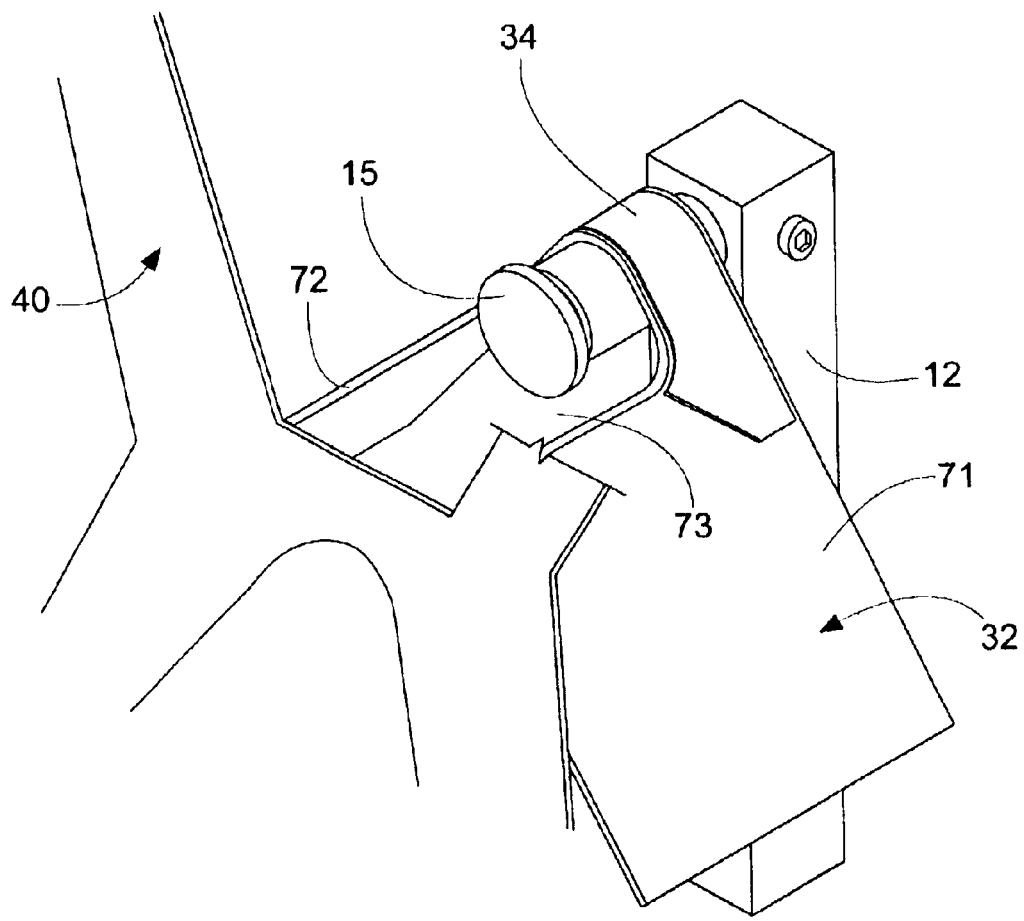
FIG. 14 is a close up perspective of the rotational support arm of the pallet of the present invention.

A close up of the rotational capture arms 32 is shown in FIG. 14 wherein the rotational capture arm or support arms 32 have a first depending wall 71 and a second depending wall 72 with the support arm head 34 positioned therebetween. As can be seen, the rotational capture arm 32 may be an inverted V-shaped capture arm which allows relatively easy loading on to carriage support 12 and pin 15. Further, the open top area 73 allows relatively easy positioning of the pin 15 therein and allows the pallet 40 to rotate about pin 15 when the pallet is being moved on the conveyor system previously described. As shown, the support arm head 34 may be reinforced such that it is strengthened to support the entire weight of the loaded suspension pallet thereby assuring proper support of the pallet 40 presently described.

It is apparent that variations may be made to the conveyor system and pallet design of the present invention in regards to specific design elements of the individual conveyor elements or of the pallets in relation to the conveyor in order to assure a proper positioning of the pallet between the first and second conveyor. Such variations however are deemed to fall within the teachings of the present invention as generally modifications may be made to placement of the particular structure described herein while falling within the general teachings hereof.

We claim:

1. A conveyor for transporting pallets on a transport vehicle, comprising:
 a first and a second conveyor, each of said first and second conveyor having a drive chain affixed to a plurality of carriage trucks and to a forward and rear sprocket, a first and a second rotation hub, each of said carriage trucks having a carriage extending from said carriage truck and having an upper end thereof, said upper end of said carriage having a pin extending outwardly therefrom
 wherein each of said carriage trucks has a first and a second carriage wheel on opposing ends of said carriage truck.

2. The conveyor for transporting pallets of claim 1 wherein said first and said second rotation hub on each of said first and second conveyor are positioned distally apart and define an upper conveyance track and a lower conveyance track on each of said conveyor.

3. The conveyor for transporting pallets of claim 2 wherein said first and said second rotation hub has an outer wall contacting said carriage wheels on each of said carriage trucks.

4. The conveyor for transporting pallets on a transport vehicle of claim 1 further comprising a plurality of pallets positioned between said first and said second conveyor and rotationally connected to said carriages on said first conveyor and said carriages on said second conveyor.

5. The conveyor for transporting pallets of claim 2 wherein said upper and said lower conveyance tracks are co-aligned.

6. The conveyor for transporting pallets on a transport vehicle of claim 1 further comprising a plurality of pallets supported between said first and said second conveyor along an upper conveyance track and a lower conveyance track, said plurality of pallets rotationally supported on said first and said second conveyor by said carriages.

7. The conveyor for transporting pallets on a transport vehicle of claim 6 wherein each of said plurality of pallets are rotationally supported by a first and a second pin, said first pin affixed to a first carriage on said first conveyor, said second pin connected to a second carriage on said second conveyor.

8. The conveyor for transporting pallets on a transport vehicle of claim 1 wherein said first and said second conveyor define a first conveyor path and a second conveyor path, said first conveyor path above said second conveyor path, said first and said second conveyor forming an ovalized rotational conveyor system between which are supported a plurality of pallets, each of said plurality of pallets rotationally connected to said first conveyor and said second conveyor.

9. The conveyor for transporting pallets on a transport vehicle of claim 1 further comprising a plurality of pallets rotationally supported between said first and said second conveyor, said first and said second conveyor defining a continuous ovalized carriage truck track defining a upper and a lower conveyance track, each of said plurality of pallets rotationally supported between said first and said second conveyor on at least one carriage from said first conveyor and at least one carriage from said second conveyor.

10. A conveyor system for loading and transporting a plurality of pallets on a truck bed, comprising:
   a first and a second circular conveyor spaced apart and mounted on a truck bed defining an upper conveyance path and a lower conveyance path;
   a plurality of pallets suspended between said first and said second conveyor wherein each of said pallets is rotatably supported on a first and a second side by a first and a second carriage, said first carriage mounted to said first conveyor, said second carriage mounted to said second conveyor;
   each of said first and said second circular conveyor define a continuous carriage truck track, said carriage truck track retaining a drive chain affixed to said carriages;
   each of said carriages is connected to a carriage truck, said carriage truck having opposing carriage truck wheels at a first distal end and a second distal end.

11. The conveyor system of claim 10 wherein said carriage truck wheels contact an outer wall of a first and a second rotation hub when said carriage is positioned in said first rotation hub or said second rotation hub.

12. A pallet and conveyor system for loading a transport, comprising: a plurality of pallets suspended between a first conveyor and a second conveyor, said first and said second conveyor in spaced apart separated relationship, said first conveyor and said second conveyor defining a first conveyance path above a second conveyance path;
   each of said plurality of pallets rotatably supported by a first and a second carriage, said first carriage affixed to said first conveyor, said second carriage affixed to said second conveyor
   wherein each of said pallets has a first side wall and a second side wall, said first side wall having a first support arm, said second side wall having a second support arm, said first support am affixed to a first pin extending from said first carriage, said second support arm affixed to a second pin on said second carriage.

13. The pallet and conveyor system of claim 12 wherein said first conveyor and said second conveyor each has a first rotation hub and a second rotation hub at opposing distal ends.

14. A pallet and conveyor system for loading a transport, comprising:
   a plurality of pallets suspended between a first conveyor and a second conveyor, said first and said second conveyor in spaced apart separated relationship, said first conveyor and said second conveyor defining a first conveyance path above a second conveyance path;
   each of said plurality of pallets rotatably supported by a first and a second carriage, said first carriage affixed to said first conveyor, said second carriage affixed to said second conveyor
   wherein each of said first and said second conveyor has a drive chain, said drive chain affixed to a plurality of carriage trucks, each of said carriage trucks having an outwardly extending carriage; and a forward sprocket and a rear sprocket connected to said drive chain.

15. A pallet and conveyor system for loading a transport, comprising:
   a plurality of pallets suspended between a first conveyor and a second conveyor, said first and said second conveyor in spaced apart separated relationship, said first conveyor and said second conveyor defining a first conveyance path above a second conveyance path;
   each of said plurality of pallets rotatably supported by a first and a second carriage, said first carriage affixed to said first conveyor, said second carriage affixed to said second conveyor wherein both said first and said second conveyor have a plurality of carriage trucks affixed to a drive chain, each of said carriage trucks having a first and a second carriage truck wheel rotatably connected thereto and positioned at opposite ends of said carriage truck.

* * * * *

UNITED STATES PATENT AND TRADEMARK OFFICE
CERTIFICATE OF CORRECTION

PATENT NO. : 6,814,214 B2
DATED : November 9, 2004
INVENTOR(S) : Warlow et al.

It is certified that error appears in the above-identified patent and that said Letters Patent is hereby corrected as shown below:

<u>Title page,</u>
Item [73], Assignee, should read -- Mobile Concepts, Inc., Myerstown, PA (US) --.

Signed and Sealed this

Twenty-second Day of November, 2005

JON W. DUDAS
*Director of the United States Patent and Trademark Office*